W. O. SHADBOLT.
VEHICLE.
APPLICATION FILED APR. 27, 1918.
1,287,468.
Patented Dec. 10, 1918.
2 SHEETS—SHEET 2.
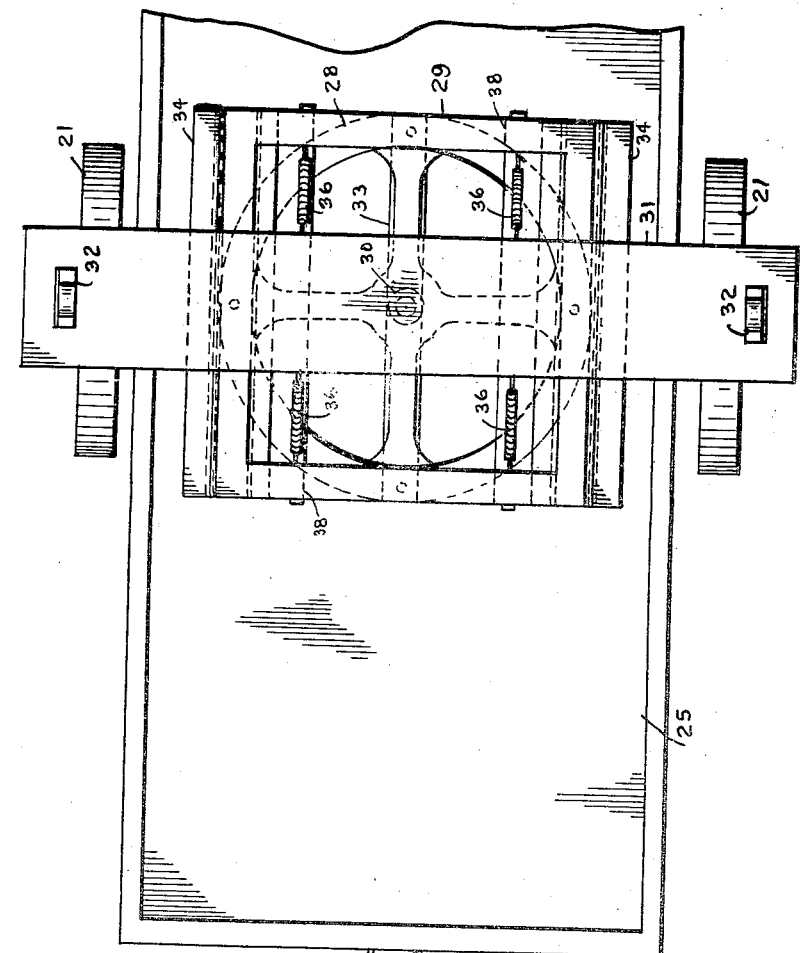
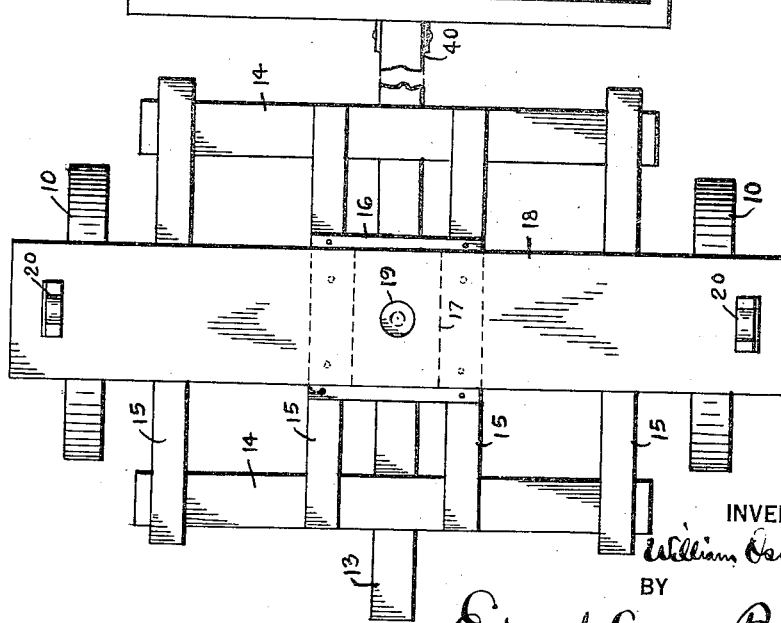
INVENTOR:
William Oscar Shadbolt
BY
Edmond Congar Brown
ATTORNEY

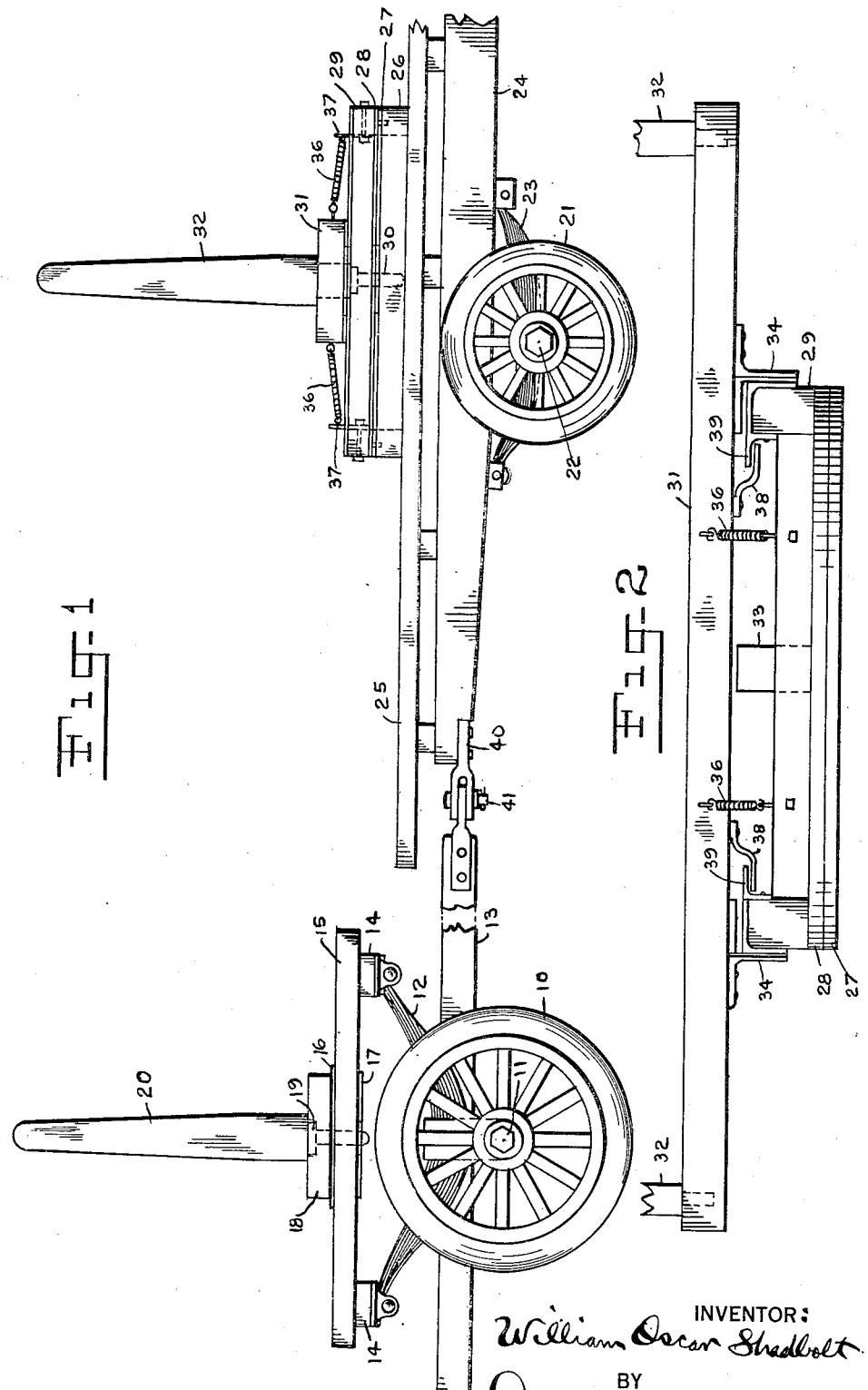

UNITED STATES PATENT OFFICE.

WILLIAM OSCAR SHADBOLT, OF BROOKLYN, NEW YORK.

VEHICLE.

1,287,468.  Specification of Letters Patent.  Patented Dec. 10, 1918.

Application filed April 27, 1918. Serial No. 231,091.

*To all whom it may concern:*

Be it known that I, WILLAIM OSCAR SHADBOLT, a citizen of the United States, and a resident of the borough of Brooklyn and the county of Kings, in the city and State of New York, have invented certain new and useful Improvements in Vehicles, of which the following is a specification.

My invention relates to vehicles and particularly to that type of vehicles which is adapted for the conveyance of long articles, such as lumber, telegraph poles or the like, and has for its object among other things to provide a vehicle adapted for such purposes in which both the front and the rear axle may be swung so as to facilitate turning corners or passing along a winding road.

The invention consists in the novel construction, arrangement and combination of various elements and parts as hereinafter particularly described and as shown in the accompanying drawings.

In the said drawings Figure 1 is a side elevation of a vehicle constructed according to one form of my invention; Fig. 2 is an end view thereof looking from the front of the vehicle, which is the right hand end of Fig. 1; and Fig. 3 is a plan view of the same.

Vehicles of the type comprising the subject-matter of the present invention, as now known in the art, consist essentially of a front and rear axle provided with suitable wheels, with springs if desired, the axles being connected by a long reach rigidly secured to the rear axle and pivotally secured to the front axle; means are often provided for adjustably securing the rear axle to said reach, so as to make the distance between the two axles longer or shorter according to the size of the load to be carried. Such a vehicle, particularly when the rear axle is secured near the rear end of a long reach, so that the distance between the two axles is very great, experiences great difficulty in turning the corners of a city street or making a sharp turn of any kind, as is well known. If it is sought to overcome this difficulty by employing a jointed reach, the pivoted sections of which extend respectively backward from the front axle and forward from the rear axle, so that when the front axle is swung in one direction the rear axle is swung in the opposite direction, it becomes easier to turn corners, but a new difficulty is introduced in that whenever a turn is made the rear axle is drawn up closer to the front axle than when the vehicle is proceeding straight ahead, the result being that the bolsters or other supporting means for the load upon the truck slide back and forth under said load at one end or the other of the truck, or at both ends, as the same passes around corners or curves in the road. This sliding movement is very objectionable, involving friction and, if the load is heavy, tending to retard the turning movement, and furthermore, in the case of certain kinds of load, the same may be injured by the chafing of the sliding bolsters. In order to overcome these difficulties I have devised vehicles which are the subject matter of the present invention.

In carrying my invention into effect, in the particular embodiment thereof which I have selected for description in this specification and for illustration in the accompanying drawings, I provide a trailer, as shown at the left in Figs. 1 and 3, which comprises wheels 10, an axle 11, semi-elliptic springs 12 and an adjustable reach 13. Secured to the ends of the springs 12 are transverse members 14, and across these are placed longitudinal members 15, preferably four in number as shown in Fig. 3. Secured to the upper surfaces of the two interior members 15 is a plate 16 and secured to the under surfaces of said members is a plate 17.

A bolster 18 is pivotally secured by means of a bolt 19 passing therethrough, to the plates 16 and 17, as shown more particularly in Fig. 1. Extending upwardly from the bolster 18 are stakes or guides 20 to maintain the load in position.

At the right hand in Figs. 1 and 3 I have shown the rear end of a tractor or the like in which 24 is a portion of the chassis, supported by running-gear comprising wheels 21, an axle 22 and springs 23. Supported on the chassis is a platform 25 to which is secured a frame 26 of substantially rectangular form bearing the lower member 27 of a fifth wheel. The corresponding upper member 28 of this fifth wheel lies directly above and has secured to its upper surface a frame 29 similar to the frame 26. Supported on the frame 29 is a transverse bolster 31 provided with stakes or guides 32. The frames 26 and 29 are provided near their middle portions with members 33 extending thereacross, only one of which, however, can be shown in the drawings (see Fig. 3). A king bolt 30 extends through the members 33 and the upper and lower members of the fifth wheel, thus pivotally securing said elements together, the bolster 31, however, is free to slide forward and backward on the frame 29, this sliding movement being controlled and limited by springs 36, one end of each of which is attached to said bolster and the other to brackets 37 on the frame 29.

Referring now particularly to Fig. 2, which is an end view looking from the right of Fig. 1 it will be seen that the bolster 31 is provided with downwardly extending angle irons 34 which bear against the outer surfaces of the frame 29 in order to prevent lateral displacement of the bolster. The said bolster also bears on its under side brackets 38 to engage with flanges 39 secured to the frame 29.

Rearwardly extending from the tractor is a reach 40 which may be secured by a bolt 41 or in any suitable manner (see Fig. 1) to the reach 13.

The material to be carried, which may be telegraph poles or other long material is piled up upon the bolsters 18 and 31, and held in place by the stakes 20 and 32. When the vehicle is moved and passes around a corner or a bend in the road, the rear end of the tractor and the reach 40 will of course swing laterally, carrying with it the forward end of the reach 13 and causing the axles 11 and 22 to swing in opposite directions, thus greatly facilitating the turning of corners &c. This action, however, will obviously lessen the distance between the centers of the bolsters 18 and 31, and if both of said bolsters are rigid upon their supports, it would cause one or both of them to slide backward and forward under the load. The arrangement of the bolster 31 as above described obviates this. It will be seen that as the axles swing one way or the other and thereby draw nearer together or farther apart, the bolster 31 is not only free to turn pivotally in the same manner as the bolster 18, but is also free to move backward and forward within reasonable limits and thereby prevent any friction or chafing between it and the load. The advantages of this construction will therefore be obvious.

I do not limit myself to the construction above described, but it will be readily understood that various modifications may be made without departing from the spirit and scope of my invention. For instance the bolster 32 and other parts in connection therewith need not be necessarily located on a tractor as I have shown, but may be upon an ordinary form of running gear similar to that shown at the left at Fig. 1.

Having thus described my invention, what I claim as new and desire to secure by Letters Patent, is as follows:

1. In a vehicle, the combination with front and rear running gears, a reach extending from the axle of each running gear toward the other running gear, and devices pivotally connecting the free ends of said reaches together, whereby when the axle of one running gear is swung in one direction the axle of the other running gear will be swung in the other direction; of a fifth wheel mounted on one of said running gears comprising an upper and a lower member and means pivotally connecting the same, load-supporting means borne by and slidably secured to the upper member of said fifth wheel so as to be capable of movement toward and away from the other of said running gears, and load supporting means pivotally secured to the other of said running gears.

2. In a vehicle, the combination with front and rear running gears, a reach extending from the axle of each running gear toward the other running gear, and devices pivotally connecting the free ends of said reaches together, whereby when the axle of one of said running gears is swung in one direction the axle of the other running gear will be swung in the other direction; of a fifth wheel on one of said running gears comprising an upper and a lower member and means pivotally connecting the same, and load-supporting means borne by and slidably secured to the upper member of said fifth wheel so as to be capable of movement toward and away from the other of said running gears, means adapted to limit the extent of the slide of said load-supporting means and load supporting means pivotally secured to the other of said running gears.

3. In a vehicle, the combination with front and rear running gears, a reach extending from the axle of each running gear toward the other running gear, and devices pivotally connecting the free ends of said reaches together, whereby when the axle of one of said running gears is swung in one direction the axle of the other running gear will be swung in the other direction; of a fifth wheel on one of said running gears comprising an upper and a lower member and means pivotally connecting the same, and load-supporting means borne by and slidably secured to the upper member of said fifth wheel so as to be capable of movement toward and away from the other of said running gears, resilient means adapted to control the sliding movement of said load-supporting means, and load supporting means pivotally secured to the other of said running gears.

4. In a vehicle, the combination with a tractor comprising running gear, a trailer comprising running gear, devices extending rearwardly from said tractor running gear, devices extending forwardly from the axle of said trailer running gear, and devices adapted to pivotally connect together said rearwardly and forwardly extending devices whereby when the axle of one running gear is swung in one direction the axle of the other running gear is swung in the other direction; of a fifth wheel mounted on one of said running gears comprising an upper and a lower member and means pivotally connecting the same, load-supporting means borne by and slidably connected to the upper member of said fifth wheel so as to be capable of movement toward and away from the other of said running gears, and load-supporting means pivotally secured to the other of said running gears.

5. In a vehicle, the combination with a tractor comprising running gear, a trailer comprising running gear, devices extending forwardly from the axle of said trailer running gear and slidably adjustable thereon, devices extending rearwardly from said tractor running gear, and means adapted to pivotally connect said devices extending forwardly from the axle of said trailer running gear and said devices extending rearwardly from said tractor running gear; of a fifth wheel mounted on one of said running gears comprising an upper and a lower member and means pivotally connecting the same, load-supporting means borne by and slidably connected to the upper member of said fifth wheel so as to be capable of movement toward and away from the other of said running gears, and load-supporting means pivotally secured to the other of said running gears.

6. In a vehicle, the combination with a tractor comprising running gear, a trailer comprising running gear, devices extending rearwardly from said tractor running gear, devices extending forwardly from the axle of said trailer running gear, and devices adapted to pivotally connect together said rearwardly and forwardly extending devices whereby when the axle of one running gear is swung in one direction the axle of the other running gear is swung in the other direction; of a fifth wheel mounted on one of said running gears comprising an upper and a lower member and means pivotally connecting the same, and load-supporting means borne by and slidably secured to the upper member of said fifth wheel so as to be capable of movement toward and away from the other of said running gears, means adapted to limit the extent of the slide of said load-supporting means and load-supporting means pivotally secured to the other of said running gears.

7. In a vehicle, the combination with a tractor comprising running gear, a trailer comprising running gear, devices extending rearwardly from said tractor running gear, devices extending forwardly from the axle of said trailer running gear, and devices adapted to pivotally connect together said rearwardly and forwardly extending devices whereby when the axle of one running gear is swung in one direction the axle of the other running gear is swung in the other direction; of a fifth wheel on one of said running gears comprising an upper and a lower member and means pivotally connecting the same, and load-supporting means borne by and slidably secured to the upper member of said fifth wheel so as to be capable of movement toward and away from the other of said running gears, resilient means adapted to control the sliding movement of said load-supporting means, and load-supporting means pivotally secured to the other of said running gears.

Signed at New York city, N. Y., this 26th day of April, 1918.

WILLIAM OSCAR SHADBOLT.